United States Patent
Manuzak et al.

(10) Patent No.: US 8,762,786 B2
(45) Date of Patent: *Jun. 24, 2014

(54) SERVER THROTTLED CLIENT DEBUGGING

(71) Applicant: International Business Machines Corporation, Armonk, NY (US)

(72) Inventors: Jonathan M. Manuzak, Winterville, NC (US); Omar E. Perez, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,167

(22) Filed: Mar. 7, 2013

(65) Prior Publication Data

US 2013/0185597 A1 Jul. 18, 2013

Related U.S. Application Data

(63) Continuation of application No. 12/827,148, filed on Jun. 30, 2010, now Pat. No. 8,407,524.

(51) Int. Cl.
 *G06F 11/00* (2006.01)
(52) U.S. Cl.
 USPC ............................... 714/38.1; 714/25; 714/48
(58) Field of Classification Search
 USPC ......................................... 714/2, 25, 38.1, 42
 See application file for complete search history.

(56) References Cited

U.S. PATENT DOCUMENTS

| | | | |
|---|---|---|---|
| 6,668,369 B1 | 12/2003 | Krebs et al. | |
| 7,757,217 B2 * | 7/2010 | Sivaram | 717/128 |
| 8,127,181 B1 * | 2/2012 | Shebanow et al. | 714/38.13 |
| 2005/0120276 A1 * | 6/2005 | Kolawa et al. | 714/38 |
| 2009/0013208 A1 | 1/2009 | DiMuzio | |
| 2009/0287950 A1 * | 11/2009 | Piazza et al. | 714/2 |

FOREIGN PATENT DOCUMENTS

WO    WO2004057834 A3    7/2004

OTHER PUBLICATIONS

Goldsmith, S. et al., Relational Queries Over Program Traces, ACM, OOPSLA '05, Oct. 16-20, 2005, San Diego, CA, USA.
Non-Final Office Action for U.S. Appl. No. 12/827,148, mailed May 9, 2012, 18 pages, U.S. Patent and Trademark Office.

* cited by examiner

*Primary Examiner* — Sarai Butler
(74) *Attorney, Agent, or Firm* — Jordon IP Law, LLC

(57) ABSTRACT

Systems and methods of debugging client applications may provide for detecting a runtime error in a first version of a client application, and obtaining a second version of the client application server in response to the runtime error. The second version of the client application may be used to conduct a diagnosis of the runtime error.

19 Claims, 3 Drawing Sheets

SERVER THROTTLED CLIENT DEBUGGING

CROSS-REFERENCE TO RELATED APPLICATIONS

The present application is a continuation of U.S. patent application Ser. No. 12/827,148 filed on Jun. 30, 2010.

BACKGROUND

1. Technical Field

Embodiments of the present invention generally relate to application debugging. More particularly, embodiments relate to client-side application debugging.

2. Discussion

In modern web-based applications, the performance of the application may be directly related to the size and amount of the files that are served to the client. Efforts to reduce the amount, and therefore size, of client-side code can be at odds with efforts to include a multitude of meaningful logging, debugging and tracing functionality. A common practice may be to remove unnecessary white-space at build time and compress the source files before serving them to the client. This approach could still include, however, all of the trace, debug and log statements, which may not always be needed.

BRIEF SUMMARY

Embodiments may provide for a computer program product including a computer readable storage medium and computer usable code stored on the computer readable storage medium. If executed by a processor, the computer usable code causes a computer to detect a runtime error in a first version of a client application and obtain a second version of the client application from a server in response to the error. The computer usable code, if executed, can also cause a computer to use the second version of the client application to conduct a diagnosis of the error.

Embodiments may also provide for a method of debugging a client application in which a runtime error is detected in a first version of the client application. A second version of the client application can be obtained in response to the error, wherein the second version of the client application is used to conduct a diagnosis of the error.

In addition, embodiments can include a method of debugging a client application in which a runtime error is detected in a first version of a client application. A server notification may be transmitted in response to the runtime error, wherein the server notification includes one or more details of the error. A second version of the client application can be received, wherein the second version of the client application has a debug capability that corresponds to a level of the error. The method may also provide for installing the second version of the client application and using the second version of the client application to conduct a diagnosis of the error.

Other embodiments can include a computer program product having a computer readable storage medium and computer usable code stored on the computer readable storage medium. If executed by a processor, the computer usable code can cause a computer to receive a server notification, wherein the server notification is to include one or more details of a runtime error associated with a first version of the client application. A second version of the client application may be selected based on the one or more details of the error and the second version of the client application can be transmitted to a client.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
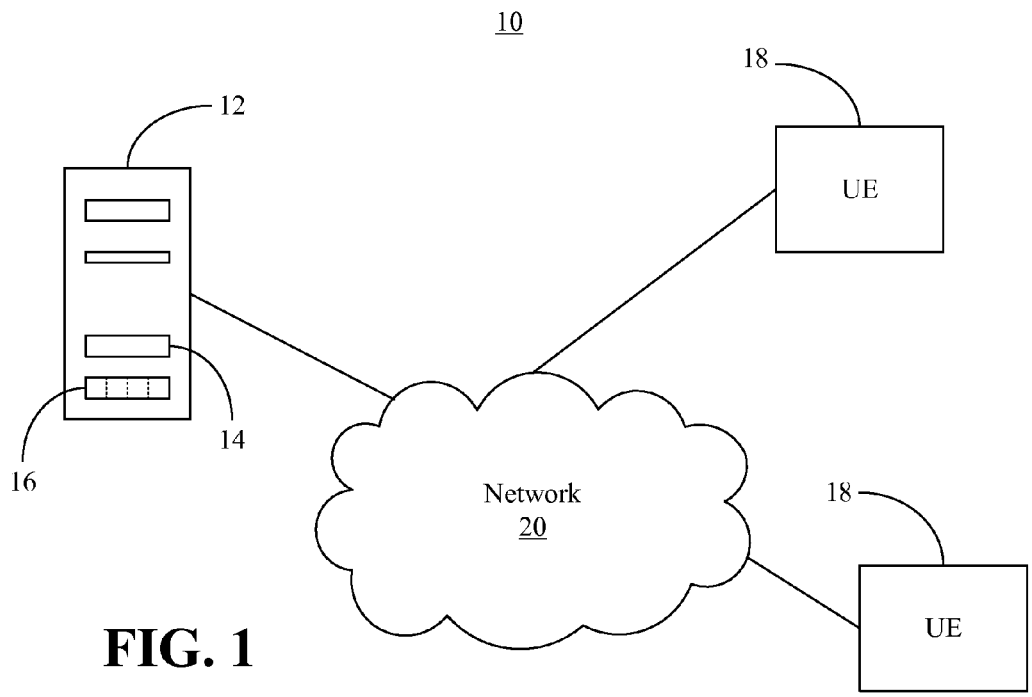
FIG. 1 is a block diagram of an example of a networking architecture according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a networking architecture 10 is shown in which a server 12 uses either a production version 14 of an application or one or more debug versions 16 of an application to communicate with client-side user equipment (UE) 18. In the illustrated example, the UE 18 may include a personal computer (PC), notebook computer, personal digital assistant (PDA), wireless smartphone, or other device having access to the server 12, via a network 20. The UE 18 connection to the network 20 may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. The UE 18 and server 12 could be located in the same physical location or in different locations.

In addition, the network 20 can include any suitable combination of servers, access points, routers, base stations, mobile switching centers, public switching telephone network (PSTN) components, etc., to facilitate communication between the UE 18 and the server 12. The server 12 may include distributed and/or redundant web-based servers that are able to respond to web page requests for content. Thus, the server 12 can have stored thereon hypertext markup language (HTML) and other markup language-encoded content, as well as databases and applications such as Java and other applications. The server 12 could also be part of a cloud computing environment in which resources are shared across platforms in a complex fashion.

The versions 14, 16 of the application, which might enable a wide variety of activities including, but not limited to, electronic commerce (e-commerce), multimedia, gaming, business-to-business (B2B) activities, etc., can include both server-side logic and client-side logic. Generally, the UE 18 initially loads/installs and uses client-side logic of the production version 14 during normal operation. The production version 14 of the application may include minimal debugging capability in order to minimize the size of the client-side code to be distributed and/or installed at the UE 18. Thus, the production version 14 of the application might be equipped to handle only trivial errors and exceptions such as an HTTP code 404 for a piece of content not being found. The debug version 16 of the application, on the other hand, may have more robust debug capability than the production 14, wherein the debug version 16 can be provided to the UE 18 on an as-needed basis. In one example, the client-side logic of the debug version 16 may be developed with debug statements tagged at various error levels to obtain a plurality of "sub-versions" of the debug version 16, wherein each sub-version is equipped to handle a certain severity, level and/or type of client-side error. The debug statements might be stripped out programmatically to create the production version 14.

Figure 2:
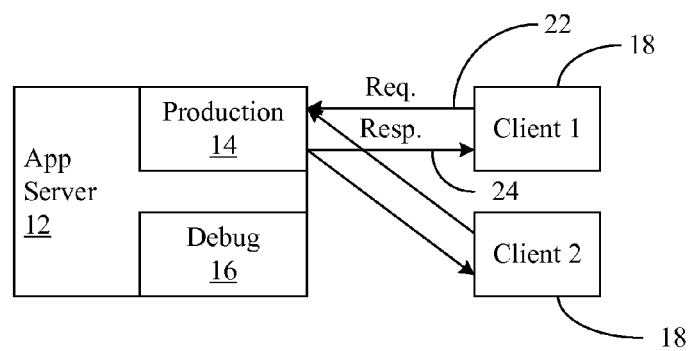
FIG. 2 is a block diagram of an example of a client and server under normal operation according to an embodiment.

FIG. 2 shows one example of normal operation between the server 12 and the UE 18 in which requests 22 are issued by the UE (Clients 1 and 2) 18 to the production version 14 of the application running on server 12. The illustrated production version 14 of the application generates responses 24 based on the requests. As already noted, the requests 22 and responses 24 might relate to e-commerce, multimedia, gaming, B2B, and other activities, and the client-side logic may be relatively small due to a lack of enhanced of debugging capability.

Figure 3:
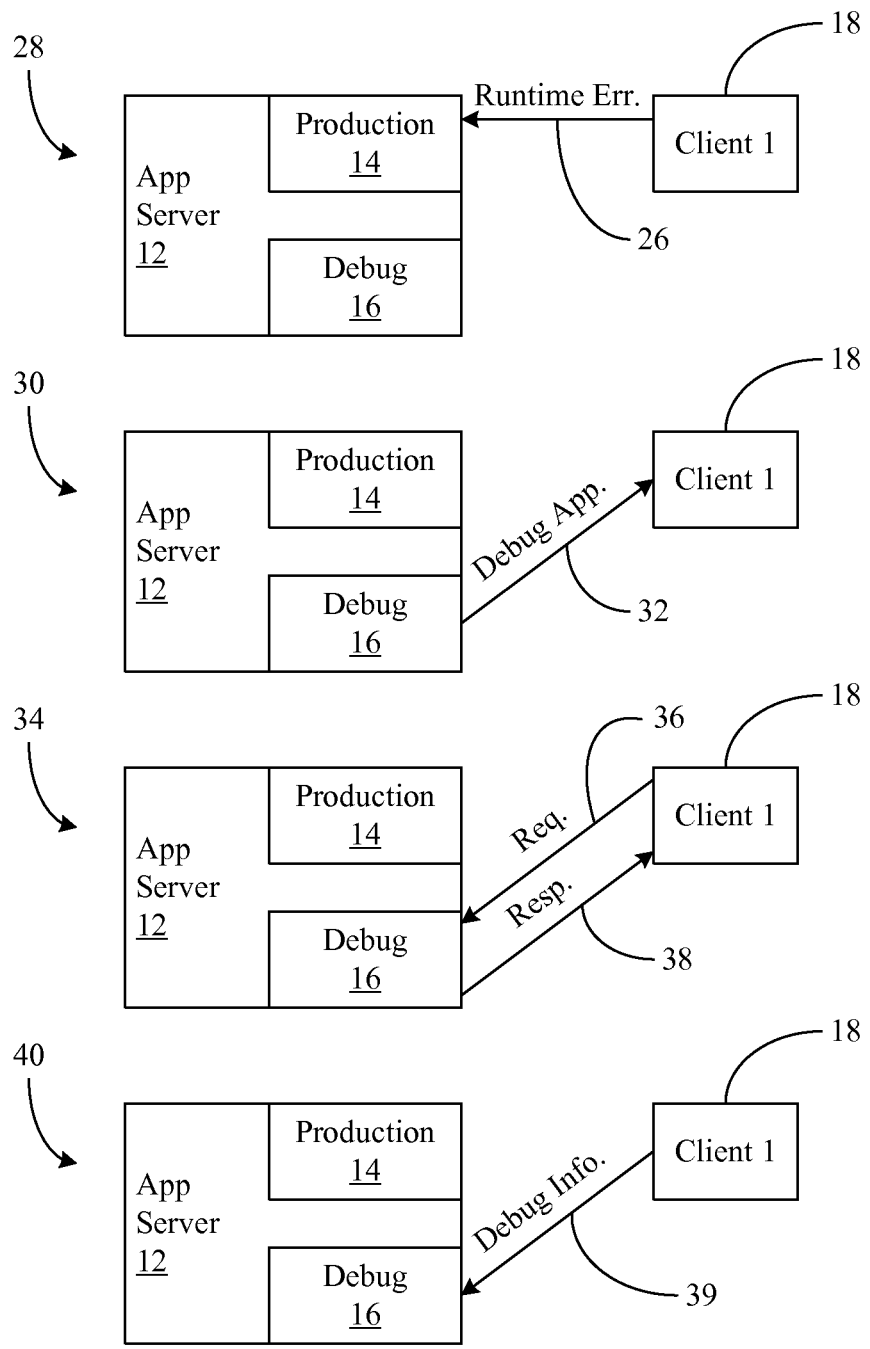
FIG. 3 is a block diagram of an example of a client and server at various stages of a debug operation according to an embodiment.

Turning now to FIG. 3, a sequence is shown in which a runtime error is encountered at the UE 18. In the illustrated example, an error notification (e.g., runtime error server notification) 26 is transmitted to the production version 14 of the server-side application logic at stage 28, wherein the notification can include one or more details of the runtime error encountered at the UE 18. In particular, the details could include an identification of the error itself as well as an identification of the state of the UE 18 at the time of the error. At stage 30, the server 12 may select a debug version 16 (e.g., from a plurality of debug versions) based on the details of the runtime error, and transmit the client-side logic 32 of the selected debug version 16 to the UE 18. Upon receipt, the UE 18 may install the client-side logic 32 of the selected debug version 16 of the application, and begin functioning and communicating using the client-side logic 32 of the debug version 16 at stage 34.

In particular, the client-side logic 32 might prompt the user of the UE 18 to retry the action that induced the runtime error and/or to take other actions with the software. The client-side logic 32 can collect and report the debug information 39 associated with these actions at stage 40. The decision to report the debug information 39 can be based on a wide variety of factors. For example, the debug information 39 might be transmitted back to the server 12 if the user navigates away from the client application (e.g., an application departure condition is met), or if a debug threshold is reached. Examples of debug thresholds include, but are not limited to, durations of time and error thresholds such as a number of errors or a level of severity.

The debug information 39 may be reported back to the server 12 via one or more request 36 and response 38 interactions, wherein the reported debug information 39 could be used to select and load other versions of the client-side debug application and/or to conduct a more detailed analysis of the results. The selection and loading of additional debug versions 16 can provide for a throttling of code instrumentation that enables a gradual increase in the size of the client-side code. Such an approach could mitigate performance degradations associated with collecting and reporting debug information 39. Once the debug version 16 of the application determines that enough information has been gathered, the client-side logic of the production version 14 may be automatically resent to the UE 18, enabling it to revert to its optimal size and performance.

Figures 4A, 4B:
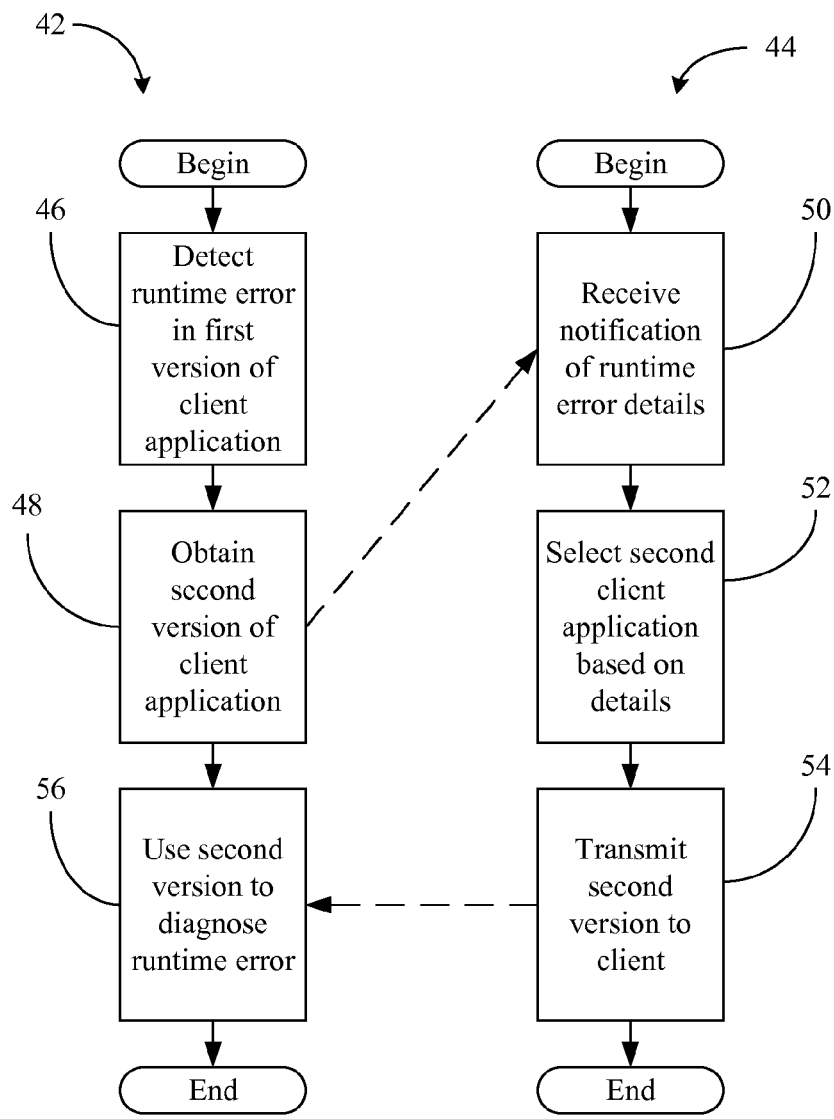
FIGS. 4A and 4B are flowcharts of examples of client-side and server-side methods, respectively, of debugging a client application according to an embodiment.

FIGS. 4A and 4B show methods 42 and 44 of client-side and server-side application debugging, respectively. The methods 42 and 44 could be implemented in executable software as a set of logic instructions stored in a machine- or computer-readable medium such as random access memory (RAM), read only memory (ROM), programmable ROM (PROM), flash memory, etc., as fixed-functionality hardware using circuit technology such as application specific integrated circuit (ASIC), complementary metal oxide semiconductor (CMOS) or transistor-transistor logic (TTL) technology, or any combination thereof.

Processing block 46 provides for detecting a runtime error in a first version of a client application. In one example, the first version is a production version of the application, wherein the runtime error is detected by client-side logic that has a high level of performance and might not be structured to handle the runtime error. A second version of the application may be obtained from a server at block 48 in response to the runtime error. For example, a server notification of the error might be issued, wherein illustrated block 50 provides for receiving the notification at the server. In the illustrated example, the server notification includes one or more details of the runtime error such as an identification of the error and an indication of the state of the client device at the time the error occurred. A second version of the client application can be selected from a plurality of debug versions at block 52, wherein the second version may have a debug capability that corresponds to the level of the runtime error.

Illustrated block 54 provides for transmitting the selected second version of the client application to the client. Once the second version of the client application has been obtained, the client may use the second version to conduct a diagnosis of the runtime error at block 56. As already discussed, the diagnosis might involve prompting for one or more actions including a re-try of the action that induced the runtime error, collecting debug information associated with the one or more actions, and transmitting the debug information to the server. Reporting of the debug information can be based on a number of factors such as debug thresholds and/or application departure conditions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   detecting a runtime error in a first version of a client application;
   obtaining a second version of the same client application from a server in response to the runtime error; and
   using the second version of the same client application to conduct a diagnosis of the runtime error.

2. The method of claim 1, wherein obtaining the second version of the same client application includes:
   transmitting a server notification, wherein the server notification includes one or more details of the runtime error;
   receiving the second version of the same client application; and
   installing the second version of the same client application.

3. The method of claim 1, wherein using the second version of the client application to conduct the diagnosis includes:
   prompting for one or more actions including a re-try of an action that induced the runtime error;
   collecting debug information associated with the one or more actions; and
   transmitting the debug information.

4. The method of claim 3, wherein the debug information is transmitted if a debug threshold is reached.

5. The method of claim 4, wherein the debug threshold includes a duration of time.

6. The method of claim 4, wherein the debug threshold includes an error threshold.

7. The method of claim 3, wherein the debug information is transmitted if an application departure condition is met.

8. The method of claim 1, further including receiving a third version of the client application, wherein the third version of the client application is to be used to conduct the diagnosis of the runtime error.

9. A computer program product comprising:
   a non-transitory computer readable storage medium; and computer usable code stored on the computer readable storage medium, where, if executed by a processor, the computer usable code causes a computer to:

detect a runtime error in a first version of a client application;

obtain a second version of the same client application from a server in response to the runtime error; and use the second version of the same client application to conduct a diagnosis of the runtime error.

10. The computer program product of claim 9, wherein the computer usable code, if executed, further causes a computer to:

transmit a server notification, wherein the server notification is to include one or more details of the runtime error;

receive the second version of the same client application; and install the second version of the same client application.

11. The computer program product of claim 9, wherein the computer usable code, if executed, further causes a computer to:

prompt for one or more actions including a re-try of an action that induced the runtime error;

collect debug information associated with the one or more actions; and transmit the debug information.

12. The computer program product of claim 11, wherein the computer usable code, if executed, further causes a computer to transmit the debug information if a debug threshold is reached.

13. The computer program product of claim 12, wherein the debug threshold is to include a duration of time.

14. The computer program product of claim 12, wherein the debug threshold is to include an error threshold.

15. The computer program product of claim 11, wherein the computer usable code, if executed, further causes a computer to transmit the debug information if an application departure condition is met.

16. The computer program product of claim 9, wherein the computer usable code, if executed, further causes a computer to receive a third version of the client application, wherein the third version of the client application is to be used to conduct the diagnosis of the runtime error.

17. A computer program product comprising:

a non-transitory computer readable storage medium; and computer usable code stored on the computer readable storage medium, where, if executed by a processor, the computer usable code causes a computer to:

receive a server notification, the server notification to include one or more details of a runtime error associated with a first version of a client application;

select a second version of the same client application based on the one or more details of the runtime error; and transmit the second version of the client application to a client.

18. The computer program product of claim 17, wherein the computer usable code, if executed, further causes a computer to receive debug information associated with a diagnosis of the runtime error by the second client application.

19. The computer program product of claim 17, wherein the computer usable code, if executed, further causes a computer to:

select a third version of the client application based on the debug information; and transmit the third version of the client application to the client.

* * * * *